United States Patent
Li

(10) Patent No.: US 11,991,631 B2
(45) Date of Patent: May 21, 2024

(54) MONITORING METHOD, SIGNALING ISSUING METHOD, AND COMMUNICATION DEVICE

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 269 days.

(21) Appl. No.: 17/613,148

(22) PCT Filed: May 24, 2019

(86) PCT No.: PCT/CN2019/088433
§ 371 (c)(1),
(2) Date: Nov. 22, 2021

(87) PCT Pub. No.: WO2020/237446
PCT Pub. Date: Dec. 3, 2020

(65) Prior Publication Data
US 2022/0322232 A1 Oct. 6, 2022

(51) Int. Cl.
*H04W 52/02* (2009.01)
*H04W 76/28* (2018.01)

(52) U.S. Cl.
CPC ... *H04W 52/0229* (2013.01); *H04W 52/0248* (2013.01); *H04W 76/28* (2018.02)

(58) Field of Classification Search
CPC ......... H04W 52/0229; H04W 52/0248; H04W 76/28
USPC ....................................... 370/311
See application file for complete search history.

(56) References Cited

FOREIGN PATENT DOCUMENTS

| CN | 109496452 A | 3/2019 |
|---|---|---|
| WO | WO 2018031327 A1 | 2/2018 |

OTHER PUBLICATIONS

R2-1903200 (Year: 2019).*

(Continued)

*Primary Examiner* — Intekhaab A Siddiquee
(74) *Attorney, Agent, or Firm* — COZEN O'CONNOR

(57) ABSTRACT

A method for monitoring a physical downlink control channel (PDCCH) includes: switching from a source bandwidth part to a target bandwidth part; and monitoring the PDCCH according to a monitoring strategy, in response to missing a monitoring moment of the first wake-up signal on the target BWP.

20 Claims, 5 Drawing Sheets

(56) References Cited

OTHER PUBLICATIONS

R2-1904663 (Year: 2019).*
R2-1903199 (Year: 2019).*
R1-1906980 (Year: 2019).*
European Patent Application No. 19930367.8, Search and Opinion dated May 2, 2022, 12 pages.
Intel Corporation "UE Adaptation to the traffic and UE power consumption characteristics" 3GPP TSG RAN WG1 Ad-Hoc Meeting 1901; R1-1900508; Jan. 2019; 9 pages.
Vivo "PDCCH-based power saving signal channel design" 3GPP TSG RAN WG1 #96bis, R1-1904103; Apr. 2019; 7 pages.
LG Electronics Inc. "Wake-up signal related to DRX" 3GPP TSG-RAN2#105bis, R2-1904663; Apr. 2019; 3 pages.
Russian Patent Application No. 2021136374, Office Action dated Jun. 2, 2022; 7 pages.
Russian Patent Application No. 2021136374, English translation of Office Action dated Jun. 2, 2022; 5 pages.
International Patent Application No. PCT/CN2019/088433, International Search Report dated Feb. 27, 2020, 3 pages.
Samsung: "PDCCH-based power saving signal/channel", R1-1906980, 3GPP TSG RAN WG1 #97, May 2019, 12 pages.

* cited by examiner

MONITORING METHOD, SIGNALING ISSUING METHOD, AND COMMUNICATION DEVICE

CROSS-REFERENCE TO RELATED APPLICATION

This application is the US national application of International Application No. PCT/CN2019/088433, filed on May 24, 2019, the entire contents of which are incorporated herein by reference for all purposes.

TECHNICAL FIELD

The disclosure relates to but not limited to the field of wireless communication technology, in particular to a method and an apparatus for monitoring a physical downlink control channel (PDCCH), a method and an apparatus for sending a signaling, a communication device and a non-transitory computer-readable storage medium.

BACKGROUND

Terminals are known to have a discontinuous reception (DRX) state, and terminals in the DRX state have a lower power consumption than terminals in a connected state.

In the DRX state, a DRX cycle is set. As shown in FIG. 1, the DRX cycle includes: on-duration (i.e., an awake mode) and opportunity for DRX (i.e., a sleep mode).

In the on-duration, the terminal is in the awake state, and the terminal can monitor a physical downlink control channel (PDCCH). In the opportunity for DRX, the terminal is in the dormant state, and the terminal cannot monitor the PDCCH.

In order to further save the power consumption of the terminal in the DRX state, a wake up signaling (WUS) is introduced. The WUS is sent before the on-duration. The terminal monitors the PDCCH by monitoring the WUS to determine whether the awake state needs to be maintained in the subsequent on-durations.

SUMMARY

According to a first aspect of the disclosure, a method for monitoring a PDCCH includes: switching from a source band width part (BWP) to a target BWP; and monitoring the PDCCH according to a monitoring strategy, in response to missing a monitoring moment of the first wake-up signal on the target BWP.

According to a second aspect of the disclosure, a communication device includes: a transceiver, a memory and a processor. The processor is respectively connected to the transceiver and the memory. The processor is configured to control transmission and reception of the transceiver by executing computer-executable instructions stored on the memory, the processor is caused to implement the method for monitoring a PDCCH. The method includes switching from a source band width part (BWP) to a target BWP; and monitoring the PDCCH according to a monitoring strategy, in response to missing a monitoring moment of the first wake-up signal on the target BWP.

According to a third aspect of the disclosure, a non-transitory computer-readable storage medium on which computer-executable instructions are stored. When the computer-executable instructions are executed by a processor, a method for monitoring a PDCCH is implemented. The method includes switching from a source band width part (BWP) to a target BWP; and monitoring the PDCCH according to a monitoring strategy, in response to missing a monitoring moment of the first wake-up signal on the target BWP.

DETAILED DESCRIPTION

The network architecture and business scenarios described in the embodiments of the disclosure are intended to more clearly illustrate the technical solution of the embodiments of the disclosure, and do not constitute a limitation on the technical solution of the embodiments of the disclosure. Those of ordinary skill in the art will know that with the evolution of the network architecture and the emergence of new business scenarios, the technical solution of the embodiments of the disclosure are equally applicable to similar technical problems.

Figure 1:
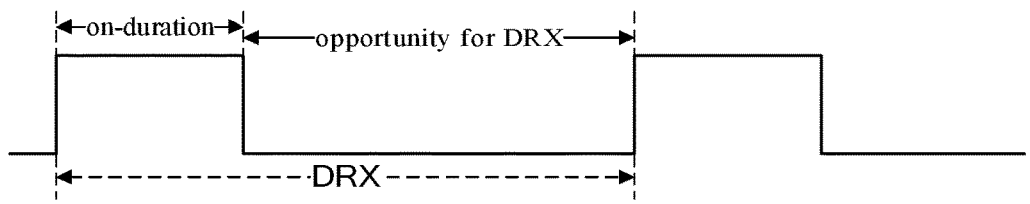
FIG. 1 is a schematic diagram of a discontinuous reception (DRX) state.
Figure 2:
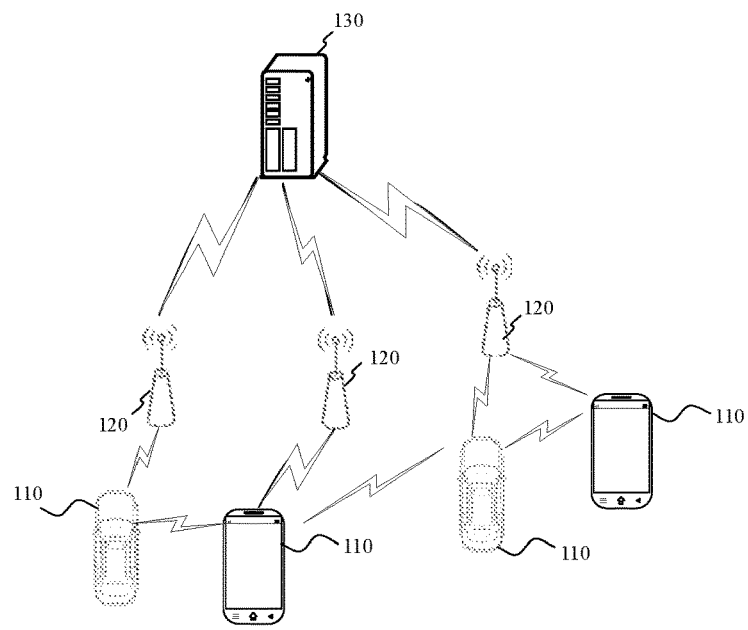
FIG. 2 is a structural schematic diagram of a wireless communication system according to an embodiment of the disclosure.

FIG. 2 is a structural schematic diagram of a wireless communication system according to an embodiment of the disclosure. As shown in FIG. 2, the wireless communication system is a communication system based on cellular mobile communication technology. The wireless communication system may include several terminals 110 and several base stations 120.

The terminal 110 may be a device that provides voice and/or data connectivity to the user. The terminal 110 can communicate with one or more core networks via a radio access network (RAN). The terminal 110 can be an IoT terminal, such as a sensor device, a mobile phone (or a cellular phone), and a computer with the IoT terminal, which may be for example, a fixed, portable, pocket-sized, hand-held, built-in computer or on-board device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may also be a device with an unmanned aerial vehicle, or may also be an on-board device, for example, an electronic control unit (ECU) having a wireless communication function, or a wireless communication device externally connected to the ECU. Alternatively, the terminal 110 may also be a roadside device, such as, a street lamp, signal lamp, or other roadside device having a wireless communication function.

The base station 120 may be a network side device in a wireless communication system. The wireless communication system may be the 4th generation mobile communication (4G) system, also known as the long term evolution (LTE) system. The wireless communication system may also be a 5G system, also known as the new radio (NR) system or 5G NR system. Alternatively, the wireless communication system may also be a next-generation system of the 5G system. The access network in the 5G system can be called new generation-radio access network (NG-RAN).

The base station 120 may be an evolved base station (eNB) adopted in the 4G system. Alternatively, the base station 120 may also be a base station (gNB) adopting a centralized and distributed architecture in the 5G system. When the base station 120 adopts the centralized and distributed architecture, it generally includes a central unit (CU) and at least two distributed units (DUs). The CU is provided with a packet data convergence protocol (PDCP) layer, a radio link control (RLC) layer, and a protocol stack of a media access control (MAC) layer. The DU is provided with a protocol stack of a physical (PHY) layer, and the embodiment of the disclosure does not limit the specific implementation of the base station 120.

The wireless connection can be established between the base station 120 and the terminal 110 through a wireless air interface. In different embodiments, the wireless air interface is a wireless air interface based on the 4G standard. Alternatively, the wireless air interface is a wireless air interface based on the 5G standard. For example, the wireless air interface is a NR; or, the wireless air interface can also be a wireless air interface based on a standard of next generation mobile communication network technology based on the 5G standard.

In some embodiments, an end to end (E2E) connection may also be established among the terminals 110, for example, scenes for vehicle to vehicle (V2V) communication, vehicle to Infrastructure (V2I) communication and vehicle to pedestrian (V2P) communication in a vehicle to everything (V2X) communication.

In some embodiments, the wireless communication system may further include a network management device 130.

The several base stations 120 are connected to the network management device 130 respectively. The network management device 130 may be a core network device in the wireless communication system. For example, the network management device 130 may be a mobility management entity (MME) in an evolved packet core (EPC). Alternatively, the network management device may also be other core network devices, such as a serving gateway (SGW), a public data network gateway (PGW), and a policy and charging rules function (PCRF) unit or a home subscriber server (HSS). The implementation of the network management device 130 is not limited in the embodiments of the disclosure.

Figure 3A:
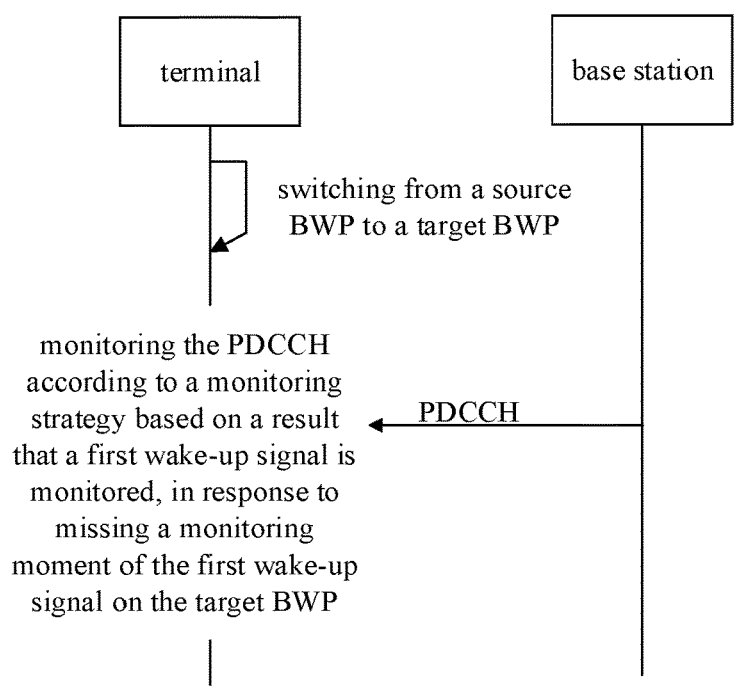
FIG. 3A is a flowchart of a method for monitoring a physical downlink control channel (PDCCH) according to an embodiment of the disclosure.

As illustrated in FIG. 3A, the embodiments provide a method for monitoring a PDCCH includes: switching from a source band width part (BWP) to a target BWP; and monitoring the PDCCH according to a monitoring strategy based on a result that a first wake-up signal is monitored, in response to missing a monitoring moment of the first wake-up signal on the target BWP.

Figure 3B:
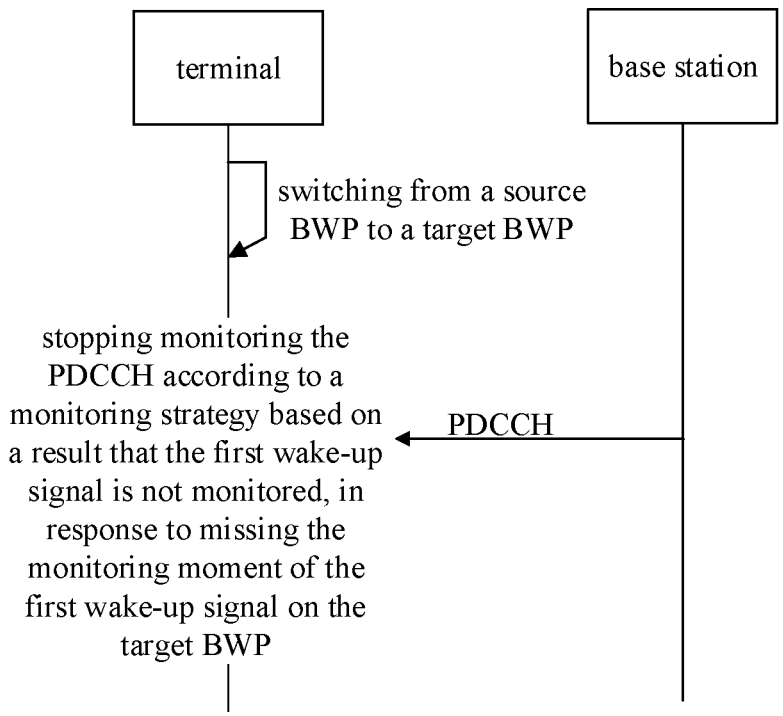
FIG. 3B is a flowchart of a method for monitoring a physical downlink control channel (PDCCH) according to an embodiment of the disclosure.

As illustrated in FIG. 3B, the embodiments provide a method for monitoring a PDCCH includes: switching from the source BWP to the target BWP; and stopping monitoring the PDCCH according to a monitoring strategy based on a result that the first wake-up signal is not monitored, in response to missing the monitoring moment of the first wake-up signal on the target BWP.

In an embodiment, the terminal switches on different BWPs, and switching from the source BWP to the target BWP includes: establishing a connection between the terminal and the base station through the source BWP is changed to establishing a connection between the terminal and the base station through the target BWP; and/or interactions between the terminal and the base station through the source BWP is changed to interactions between the terminal and the base station through the target BWP, in which the content of interactions includes: data, signal and/or signaling.

A wake up signal (WUS) is set on both the source BWP and the target BWP. The base station sends a WUS before the on-duration of the DRX period, in which the WUS is used to inform the terminal whether it is necessary to maintain the awake state within one or more on-durations behind the WUS, to monitor the PDCCH within the on-durations.

WUS is a low-power detection signal, so that the terminal can detect or monitor the WUS with very low power consumption. Based on the WUS monitoring result, it is further determined whether it is necessary to monitor the PDCCH within the corresponding on-duration. If the WUS corresponding to the on-duration is not monitored by the terminal, this on-duration can be skipped, that is, the dormant state is still maintained within the on-duration, so that the PDCCH is not monitored, which further saves the power consumption of the terminal.

In this embodiment, the first wake-up signal is a type of WUS. The first wake-up signal is: the WUS for a monitoring moment being a switching moment when the terminal switches to the target BWP. The first wake-up signal is: the previous WUS for the monitoring moment being located before the switching moment when the terminal switches to the target BWP.

For example, the terminal switches to the target BWP at the moment T0, and the moment T1 before the moment T0 is the monitoring moment of a WUS1, and the first wake-up signal is the WUS1 that needs to be monitored at the moment T1.

In some embodiments, the terminal may switch the service scenarios, and according to configuration information of the BWP, the terminal switches from the source BWP to the target BWP.

In another embodiments, when balancing bandwidth load, some terminals may be switched from the source BWP to the target BWP.

However, after the terminal switches to the target BWP, it may just miss the monitoring moment of the first wake-up signal on the target BWP. At this time, the terminal does not know how to monitor the PDCCH within the on-duration.

In this regard, the terminal in this embodiment may monitor the PDCCH according to the monitoring strategy based on a result that a first wake-up signal is monitored currently, or not monitor the PDCCH based on a result that the first wake-up signal is not monitored currently. In this way, it may reduce processing disorder phenomenon of the terminal caused by a situation where the terminal does not know how to process.

In this embodiment, monitoring the PDCCH includes monitoring whether there is signal transmission on the PDCCH. The PDCCH can be used to transmit a PDCCH signaling. The PDCCH corresponds to specific time-frequency resources. When the terminal monitors the PDCCH during the on-duration, it can perform signal detection on the time-frequency resources corresponding to the PDCCH, thereby realizing the monitoring of the PDCCH.

The result that the WUS is monitored includes but are not limited to: monitoring that a signal intensity of the WUS on the corresponding bandwidth reaches a threshold value; and if the WUS is not monitored or the intensity of the monitored WUS does not reach the threshold value, it may be determined that the WUS is not monitored.

In some embodiments, monitoring the PDCCH based on the result that the first wake-up signal is monitored according to the monitoring strategy includes: according to the monitoring strategy, monitoring the PDCCH within on-durations of an effective range of the first wake-up signal based on the result that the first wake-up signal is monitored.

One WUS corresponds to a specific monitoring range of the PDCCH, and the monitoring range may be the aforementioned effective range.

For example, one WUS may correspond to one or more on-durations in the DRX period, and these on-durations are the effective range corresponding to the WUS.

Figure 4:
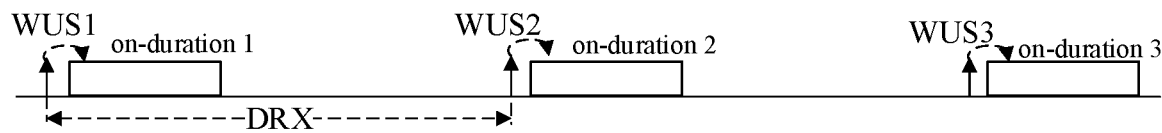
FIG. 4 is a schematic diagram of one wake up signaling (WUS) corresponding to one on-duration according to an embodiment of the disclosure.

FIG. 4 is a schematic diagram of one WUS corresponding to one on-duration. Thus, on-duration 1, on-duration 2 and on-duration 3 correspond to their respective WUSs, i.e., WUS1, WUS2 and WUS3.

Figure 5:
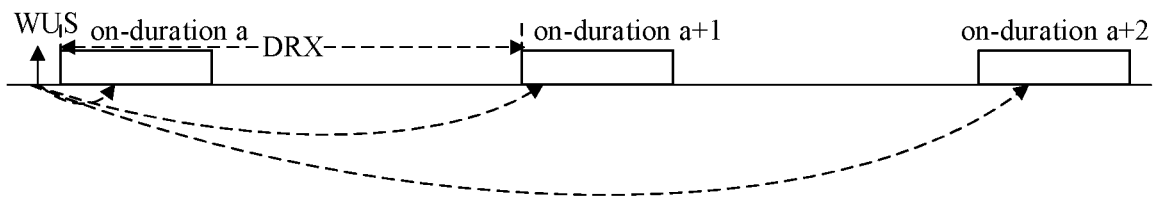
FIG. 5 is a schematic diagram of one WUS corresponding to N on-durations according to an embodiment of the disclosure.

FIG. 5 is a schematic diagram of one WUS corresponding to N on-durations. In this way, if a WUS is monitored by the terminal, it needs to monitor the PDCCH within the N on-durations corresponding to the WUS. In FIG. 5, one WUS corresponds to three on-durations, namely, on-duration a, on-duration a+1, and on-duration a+2.

The effective range of the first wake-up signal missed in this embodiment may include one or more on-durations.

In this embodiment, in response to missing the wake-up signal on the target BWP, the PDCCH may be monitored within the effective range of the first wake-up signal based on the result that the first wake-up signal is monitored, according to the monitoring strategy, which reduces unnecessary power consumption of the terminal caused by monitoring outside the effective range.

In some embodiments, monitoring the PDCCH within the on-durations of the effective range of the first wake-up signal includes: when the first wake-up signal corresponds to one of the on-durations, and the on-duration for the first wake-up signal has started, monitoring the PDCCH within a remaining duration of the on-duration for the first wake-up signal that has started at a current moment.

The current moment here includes: a moment when the terminal switches to the target BWP.

For example, one WUS corresponds to one on-duration, the effective range is an on-duration, and the PDCCH is monitored within this on-duration.

When the terminal switches from the source BWP to the target BWP, not only has it missed the monitoring of the first wake-up signal on the target BWP, but also the on-duration corresponding to the first wake-up signal has started. Then, starting from the current moment, the PDCCH is monitored within the remaining duration of the on-duration that has started, thereby avoiding missing important content sent by the PDCCH.

Figure 6:
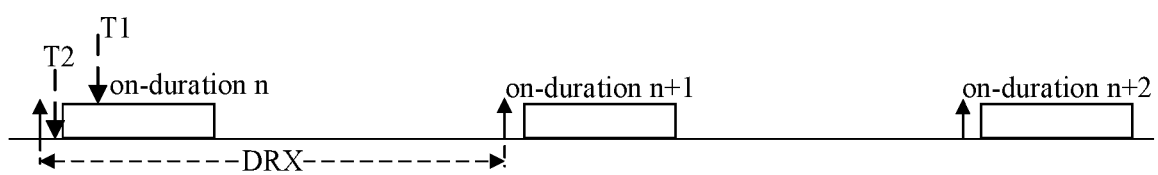
FIG. 6 is a schematic diagram of switching to a target band width part (BWP) when one WUS corresponds to one on-duration according to an embodiment of the disclosure.

As shown in FIG. 6, one WUS corresponds to one on-duration. FIG. 6 shows that there are two cases.

In case 1, after the on-duration 1 of the target BWP has started, the terminal switches to the target BWP. At this time, the terminal monitors the PDCCH from the current moment to the end moment in the on-duration 1 based on the result that the first wake-up signal is monitored according to the monitoring strategy. Referring to FIG. 2, the terminal switches to the target BWP at the moment T2 which is located in the on-duration n. At this time, the terminal missed the monitoring moment (i.e., the moment indicated by the upward solid arrow in FIG. 6) of the first wake-up signal, and monitored the PDCCH in the remaining duration of the on-duration n.

In some embodiments, monitoring the PDCCH within the on-durations of the effective range of the first wake-up signal includes: when the first wake-up signal corresponds to one of the on-durations, and the on-duration for the first wake-up signal has not started, monitoring the PDCCH within the on-duration for the first wake-up signal.

When the WUS corresponds to the on-duration one by one, and the on-duration for the first wake-up signal has not started, indicating that the switching moment when the terminal switches to the target BWP is between the monitoring moment of the first wake-up signal and the start moment of the on-duration corresponding to the first wake-up signal, then the terminal monitors the PDCCH within the entire on-duration corresponding to the current awaking moment.

In case 2, as shown in FIG. 6, the terminal switches to the target BWP between the monitoring moment of the first wake-up signal on the target BWP and the start moment of the on-duration. At this time, the terminal monitors the PDCCH in the entire on-duration for the first wake-up signal.

As shown in FIG. 6, the terminal switches to the target BWP at the moment T2 which is located between the start moment of the on-duration n corresponding to the first wake-up signal and the monitoring moment of the first wake-up signal on the target BWP. In this way, the terminal monitors the PDCCH within the entire on-duration n.

In some embodiments, monitoring the PDCCH within the on-durations of the effective range of the first wake-up signal includes: when the first wake-up signal corresponds to N on-durations, and the N on-durations for the first wake-up signal have started, monitoring the PDCCH within a remaining duration of the currently started on-duration and within M remaining on-durations behind the currently started on-duration for the first wake-up signal, where N is a positive integer being not less than 2, and M is a positive integer being less than N.

For example, N=4, M can be any integer less than 4, for example, 3, 2, or 1.

In this embodiment, after the terminal switches to the target BWP and misses the first wake-up signal, and the N on-durations for the first wake-up signal have started, the PDCCH is monitored within a remaining duration of the currently started on-duration and within remaining on-durations. For example, if the terminal switches to the target BWP during the first on-duration, when the first on-duration is not over, the terminal monitors the PDCCH in the remaining duration of the first on-duration and the second to fourth on-durations.

In some embodiments, monitoring the PDCCH within the on-durations of the effective range of the first wake-up signal includes: when the first wake-up signal corresponds to N on-durations, and the N on-durations for the first wake-up signal have started, monitoring the PDCCH within M on-durations behind the currently started on-duration for the first wake-up signal, where N is a positive integer being not less than 2, and M is a positive integer being less than N.

In this embodiment, if the switching time when the terminal switches to the target BWP just falls in the current on-duration, the PDCCH may be monitored within only M on-durations behind the current on-duration, i.e., the PDCCH may be not monitored within the current on-duration.

For example, N=3, M=2. If the terminal switches to the target BWP at a moment within the first on-duration, in this embodiment, the terminal may not continue to monitor the PDCCH within the remaining duration of the first on-duration that has started but not ended, but start monitoring the PDCCH directly starting from the second on-duration, i.e., monitoring the PDCCH within the second on-duration and the third on-duration.

In some embodiments, monitoring the PDCCH within the on-durations of the effective range of the first wake-up signal includes: when the first wake-up signal corresponds to N on-durations, and M on-durations for the first wake-up signal have not started, monitoring the PDCCH within the M on-durations for the first wake-up signal, where M is a positive integer being less than or equal to N.

In some embodiments, if the terminal switches to the target BWP when the first on-duration of the N on-durations has not started, the terminal may monitor the PDCCH within N on-durations on the target BWP.

In some embodiments, if the terminal switches to the target BWP in the opportunity for DRX between two adjacent on-durations from the N on-durations, the terminal may only monitor the PDCCH in the M remaining on-durations that have not started. For example, N=4, if the terminal switches to the target BWP after the second on-duration ends but before the third on-duration starts, the terminal may only continue to monitor the PDCCH within the remaining third and fourth on-durations.

Figure 7:
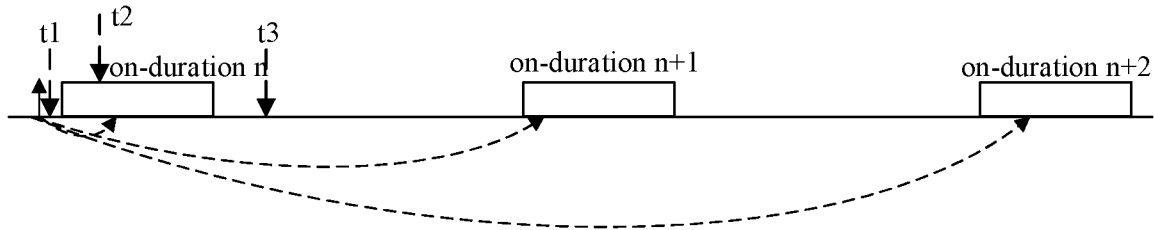
FIG. 7 is a schematic diagram of switching to a target BWP when one WUS corresponds to N on-durations according to an embodiment of the disclosure.

As shown in FIG. 7, a first wake-up signal (indicated by an upward solid arrow in FIG. 7) corresponds to 3 on-durations, namely, on-duration n, on-duration n+1, and on-duration n+2.

If the switching moment at which the terminal switches to the target BWP is t1, the terminal may miss the monitoring moment of the first wake-up signal, in which t1 is located before the start moment of the first on-duration among the three on-durations for the first wake-up signal. At this time, the terminal monitors the PDCCH in the on-duration n, the on-duration n+1, and the on-duration n+2 in sequence.

If the switching moment at which the terminal switches to the target BWP is t2, the terminal may miss the monitoring moment of the first wake-up signal, in which t2 is located after the first on-duration among the three on-durations for the first wake-up signal starts. At this time, the terminal monitors the PDCCH within the remaining duration of the on-duration n, the on-duration n+1, and the on-duration n+2 in sequence.

If the switching time at which the terminal switches to the target BWP is t2, the terminal may miss the monitoring moment of the first wake-up signal, in which t2 is located after the first on-duration among the three on-durations for the first wake-up signal starts. At this time, the terminal monitors the PDCCH in the on-duration n+1 and the on-duration n+2 in sequence.

If the switching time at which the terminal switches to the target BWP is t3, the terminal may miss the monitoring moment of the first wake-up signal, in which t3 is located after the first on-duration among the three on-durations for the first wake-up signal ends and before the on-duration n+1 starts. At this time, the terminal monitors the PDCCH in the on-duration n+1 and the on-duration n+2 in sequence.

In some embodiments, stopping monitoring the PDCCH based on the result that the first wake-up signal is not monitored, includes: stopping monitoring the PDCCH according to the monitoring strategy within on-durations of the effective range of the first wake-up signal based on the result that the first wake-up signal is not monitored.

In some embodiments, according to the monitoring strategy, the monitoring result of missing the first wake-up signal at the monitoring moment is that the WUS is not monitored. If the WUS is not monitored, the terminal can continue to keep in the dormant state within the on-duration, thereby further reducing the power consumption of the terminal.

In some embodiments, stopping monitoring the PDCCH within the on-durations of the effective range of the first wake-up signal, includes: when the first wake-up signal corresponds to one of the on-durations, and the on-duration for the first wake-up signal has started, stopping monitoring the PDCCH within a remaining duration of the on-duration for the first wake-up signal that has started at a current moment.

In this embodiment, one first wake-up signal corresponds to one on-duration, which indicates that the effective range of the first wake-up signal includes one on-duration.

At this time, a first wake-up signal corresponds to one on-duration. Since the first wake-up signal is not monitored at the monitoring moment according to the monitoring strategy, the PDCCH is no longer monitored in the on-duration corresponding to the first wake-up signal.

This non-monitoring of the PDCCH includes: non-monitoring of the PDCCH within the remaining duration of the current on-duration.

In another embodiment, stopping monitoring the PDCCH within the on-durations of the effective range of the first wake-up signal, includes: when the first wake-up signal corresponds to one of the on-durations, and the on-duration for the first wake-up signal has not started, stopping monitoring the PDCCH within the on-duration for the first wake-up signal.

If the on-duration for the first wake-up signal has not started, after the terminal switches to the target BWP, the terminal is maintained in the dormant state within the on-duration for the first wake-up signal has not started, so the PDCCH is not monitored.

In some embodiments, stopping monitoring the PDCCH within the on-durations of the effective range of the first wake-up signal, includes: when the first wake-up signal corresponds to N on-durations, and the N on-durations for the first wake-up signal have started, stopping monitoring the PDCCH within a remaining duration of the currently started on-duration and within M remaining on-durations behind the currently started on-duration, where N is a positive integer being not less than 2, and M is a positive integer being less than N.

That is, the terminal switches to the target BWP within N on-durations for the first wake-up signal. At this time, the terminal stops monitoring the PDCCH directly from the remaining duration of the currently started on-duration and the M remaining on-durations.

The currently started on-duration is an on-duration including the current moment.

In some embodiments, stopping monitoring the PDCCH within the on-durations of the effective range of the first wake-up signal, includes: when the first wake-up signal corresponds to N on-durations, and M on-durations for the first wake-up signal have not started, stopping monitoring the PDCCH within the M on-durations for the first wake-up signal, where N is a positive integer being not less than 2, and M is a positive integer being less than or equal to N.

One first wake-up signal corresponds to N on-durations, which means that the effective range of the first wake-up signal includes N on-durations.

For example, the terminal may switch to the target BWP before the first on-duration starts, and at this time, the PDCCH is not monitored within the N on-durations for the first wake-up signal.

For example, the terminal may switch to the target BWP at a dormant moment between two adjacent on-durations of N on-durations. At this time, the terminal does not monitor the PDCCH within the M on-durations behind the current moment.

In some embodiments, the method further includes: determining the result that the first wake-up signal is monitored or the result that the first wake-up signal is not monitored, in response to switching from the source BWP to the target BWP and missing the monitoring moment of the first wake-up signal on the target BWP.

In this embodiment, the result that the first wake-up signal is monitored or the result that the first wake-up signal is not monitored can be determined before monitoring the PDCCH.

There are many ways to determine, one way is to directly determine that the monitoring result of the first wake-up signal missed on the target BWP based on the configuration information is being monitored or not being monitored.

For example, the configuration of different BWP is different. According to the configuration of the current BWP, it can be directly determined whether the WUS is monitored or not at the current moment missing the monitoring moment.

In some embodiments, determining the result that the first wake-up signal is monitored or the result that the first wake-up signal is not monitored includes: determining the result that the first wake-up signal is monitored or the result that the first wake-up signal is not monitored based on configuration information.

In some embodiments, the configuration information can be one written in the protocol in advance. In other embodiments, the configuration information may be one sent by the base station to the terminal, and the terminal may send the configuration information to the terminal through a PHY layer signaling or a high-layer signaling.

In this embodiment, the configuration information can clarify that in response to missing the first wake-up signal on the target BWP, it is determined that the result that the first wake-up signal is monitored or the result that the first wake-up signal is not monitored.

In some embodiments, determining the result that the first wake-up signal is monitored or the result that the first wake-up signal is not monitored, includes: determining the result that the first wake-up signal is monitored or the result that the first wake-up signal is not monitored based on a monitoring result of a second wake-up signal.

In some embodiments, the second wake-up signal is one before the first wake-up signal. The monitoring result of the second wake-up signal reflects the current frequency of service dispatching by the terminal. The service dispatching can be divided into high-occurrence scenarios and low-occurrence scenarios according to the comparison of its current dispatching frequency with specific thresholds. The frequency of service dispatching in the high-occurrence scenario is higher than that of service dispatching in the low-occurrence scenario. In this way, the monitoring result of the first wake-up signal can be determined according to the monitoring result of the second wake-up signal. Therefore, in the high-occurrence scenario, the terminal can determine that the monitoring result of the missed first wake-up signal is being monitored, so that the terminal can maintain the awake state within one or more on-durations for the first wake-up signal to monitor the PDCCH. In this way, various signalings transmitted on the PDCCH, such as a signaling for service dispatching, is received, so that data is sent and received in time based on the signaling for service dispatching, and the data transmission delay is reduced.

In the low-occurrence scenario, the terminal can determine that the monitoring result of the first wake-up signal is not being monitored based on the historical monitoring result of the WUS. At this time, the terminal stays dormant within one or more on-durations for the first wake-up signal in the low-occurrence scenario, so that the PDCCH is not monitored, and power consumption caused by unnecessary monitoring is reduced.

In some embodiments, determining the result included in the monitoring strategy that the first wake-up signal is monitored based on the monitoring result of the second wake-up signal includes: determining that the first wake-up signal is monitored when W1 second wake-up signals are continuously monitored on the source BWP before the current moment, where W1 is a positive integer.

For example, if W1 second wake-up signals are continuously monitored on the source BWP before the current moment, it is determined that the first wake-up signal missed on the target BWP is monitored.

In some embodiments, determining the result included in the monitoring strategy that the first wake-up signal is monitored based on the monitoring result of the second wake-up signal includes: determining the result that the first wake-up signal is monitored when W2 second wake-up signals are continuously monitored on the source BWP in a predetermined duration, where W2 is a positive integer.

For example, the preset time period may be any time period, and may be any time period specified in the configuration information. For example, the end time of the preset time period may be the current time, or the switching time when the terminal switches to the target BWP, or any time before the switching moment.

If W2 second wake-up signals are continuously monitored within a time period, the terminal may determine a result that the first wake-up is monitored as a reference basis for subsequent PDCCH monitoring.

In the embodiment of the disclosure, W1 and W2 may be equal or different.

In another embodiments, determining a result of the first wake-up signal included in the monitoring strategy based on the monitoring result of the second wake-up signal, includes: in a duration T1 before the current moment, if S second wake-up signals are monitored on the source BWP, determining that the first wake-up signal on the target BWP is monitored.

The S second wake-up signals may be continuous wake-up signals or discontinuous signals.

In some embodiments, determining the result that the first wake-up signal is monitored or not monitored includes: determining the result that the first wake-up signal is monitored or not monitored based on determination information.

The determination information includes but is not limited to: determination parameters and/or determination rules.

The determination parameter includes at least one of: the W1 or W2, and the T and S.

The determination rule may include: if the W1 second wake-up signals are continuously monitored on the source BWP before the current moment, determining that the first wake-up signal on the target BWP is monitored; otherwise, determining that the first wake-up signal on the target BWP is not monitored.

In a period of time, if W2 second wake-up signals are continuously monitored on the source BWP, the terminal may determine a result that the first wake-up signal is monitored as a reference basis for subsequent PDCCH monitoring.

If S second wake-up signals are monitored on the source BWP within the duration T1 before the current moment, it is determined that the first wake-up signal on the target BWP is monitored, otherwise, it is determined that the first wake-up signal on the target BWP is not monitored.

In some embodiments, the method further includes: receiving a broadcast signaling carrying the determination information; or, receiving a dedicated signaling carrying the determination information.

The broadcast signaling is a signaling sent by a broadcasting channel, for example, a physical downlink broadcast channel. The dedicated information may include various high-level signalings, for example, a radio resource control (RRC) signaling unicasted to the corresponding terminal.

The determination information includes but is not limited to the above determination parameters and/or determination rules.

In some embodiments, the determination information can be sent by the base station. In this way, the base station can adjust the determination information adaptively according to the current needs, so as to control the terminal to switch from the source BWP to the target BWP, and to determine whether to monitor the PDCCH in the on-duration corresponding to the first wake-up signal in response to missing the monitoring moment of the first wake-up signal. Therefore, the balance between saving the power consumption of the terminal and the timeliness of interactions between the terminal and the base station is realized.

In some embodiments, the method includes: configuring the monitoring strategy in which the first wake-up signal corresponds to one of the on-durations, in response to switching from the source BWP to the target BWP and missing the monitoring moment of the first wake-up signal on the target BWP; or configuring the monitoring strategy in which the first wake-up signal corresponds to the N on-durations, in response to switching from the source BWP to the target BWP and missing the monitoring moment of the first wake-up signal on the target BWP, where N is a positive integer not less than 2.

The configuration here can be configured by the terminal itself, for example, the terminal can be configured according to a built-in protocol, or according to negotiation with the base station.

For example, a monitoring strategy that one wake-up signal corresponds to one on-duration is pre-stored in the terminal, and a monitoring strategy that one wake-up signal corresponds to N on-durations is also stored.

The monitoring strategy configured in this embodiment may include: according to the configuration information of currently switching to the target BWP, activating a monitoring strategy that one wake-up signal corresponds to one on-duration, or activating a monitoring strategy that one wake-up signal corresponds to N on-durations.

Figure 8:
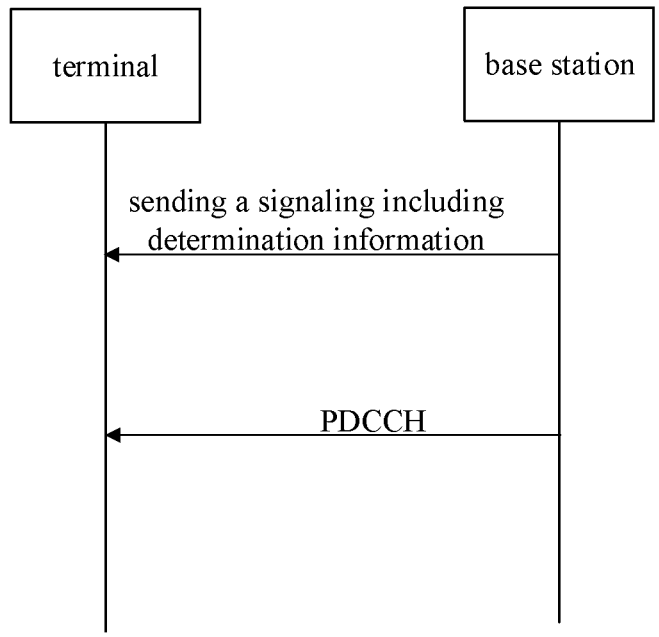
FIG. 8 is a schematic diagram of sending a signaling according to an embodiment of the disclosure.

As illustrated in FIG. 8, the embodiments of the disclosure provide a method for sending a signaling. The method includes: sending a signaling including determination information. The signaling includes: a broadcast signaling or a dedicated signaling. The determination information is used to determine a result that a first wake-up signal is monitored or not monitored based on the determination information, in response to switching from a source BWP to a target BWP and missing the first wake-up signal on the target BWP.

The method according to the embodiment can be applied to a base station, and the base station can send the determination information through the broadcast signaling or the dedicated signaling. In this way, the terminal can be switched from the source BWP to the target BWP, even if the first wake-up signal on the target BWP is missed, the terminal can still be instructed to monitor or not monitor the PDCCH based on the result that the first wake-up signal is monitored or not monitored.

In the embodiments, the method further includes: sending various signalings, such as a service dispatching signaling, through the PDCCH.

The result that the first wake-up signal is monitored or not monitored is used by the terminal to determine whether to monitor the PDCCH.

Figure 9:
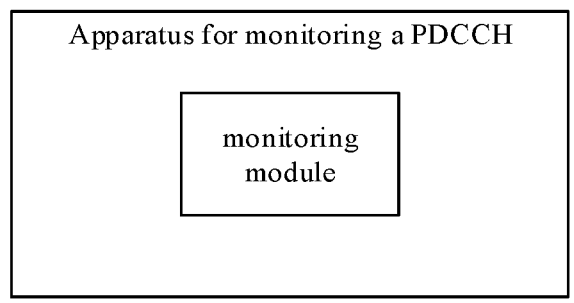
FIG. 9 is a structural schematic diagram of an apparatus for monitoring a PDCCH according to an embodiment of the disclosure.

As illustrated in FIG. 9, the embodiments of the disclosure further provide an apparatus for monitoring a PDCCH. The apparatus includes: a monitoring module, configured to switch from a source band width part (BWP) to a target BWP, and monitor the PDCCH according to a monitoring strategy based on a result that a first wake-up signal is monitored, in response to missing a monitoring moment of the first wake-up signal on the target BWP.

In some embodiments, the monitoring module is configured to switch from the source BWP to the target BWP, and stop monitoring the PDCCH according to a monitoring strategy based on a result that the first wake-up signal is not monitored, in response to missing the monitoring moment of the first wake-up signal on the target BWP.

In some embodiments, the monitoring module may be a program module. After the program module is executed by the processor, whether the PDCCH is monitored or not-monitored can be realized.

In some embodiments, the monitoring module may be a combination of software and hardware module, which includes but is not limited to a complex programmable array or a field programmable array.

In some embodiments, the monitoring module may be a pure hardware module, which may include, but is not limited to, an application specific integrated circuit.

In some embodiments, the monitoring apparatus further includes a storage module. The storage module may store a monitoring strategy. In some embodiments, the monitoring module is configured to monitor the PDCCH according to the monitoring strategy within on-durations of an effective range of the first wake-up signal based on the result that the first wake-up signal is monitored.

In some embodiments, the monitoring module is configured to when the first wake-up signal corresponds to one of the on-durations, and the on-duration for the first wake-up signal has started, monitor the PDCCH within a remaining duration of the on-duration for the first wake-up signal that has started at a current moment.

In some embodiments, the monitoring module is configured to when the first wake-up signal corresponds to one of the on-durations, and the on-duration for the first wake-up signal has not started, monitor the PDCCH within the on-duration for the first wake-up signal.

In some embodiments, the monitoring module is configured to when the first wake-up signal corresponds to N on-durations, and the N on-durations for the first wake-up signal have started, monitor the PDCCH within a remaining duration of the currently started on-duration and within M remaining on-durations behind the currently started on-duration for the first wake-up signal. N is a positive integer not less than 2, and M is a positive integer less than N.

In some embodiments, the monitoring module is configured to when the first wake-up signal corresponds to N on-durations, and the N on-durations for the first wake-up signal have started, monitor the PDCCH within M on-durations behind the currently started on-duration for the first wake-up signal. N is a positive integer not less than 2, and M is a positive integer less than N.

In some embodiments, the monitoring module is configured to when the first wake-up signal corresponds to N on-durations, and M on-durations for the first wake-up signal have not started, monitor the PDCCH within the M on-durations for the first wake-up signal. M is a positive integer less than or equal to N.

In some embodiments, the monitoring module is configured to stop monitoring the PDCCH according to the monitoring strategy within on-durations of the effective range of the first wake-up signal based on the result that the first wake-up signal is not monitored.

In some embodiments, the monitoring module is configured to when the first wake-up signal corresponds to one of the on-durations, and the on-duration for the first wake-up signal has started, stop monitoring the PDCCH within a remaining duration of the on-duration for the first wake-up signal that has started at a current moment.

In some embodiments, the monitoring module is configured to when the first wake-up signal corresponds to one of the on-durations, and the on-duration for the first wake-up signal has not started, stop monitoring the PDCCH within the on-duration for the first wake-up signal.

In some embodiments, the monitoring module is configured to when the first wake-up signal corresponds to N on-durations, and the N on-durations for the first wake-up signal have started, stop monitoring the PDCCH within a remaining duration of the currently started on-duration and within M remaining on-durations behind the currently started on-duration, N is a positive integer being not less than 2, and M is a positive integer being less than N.

In some embodiments, the monitoring module is configured to when the first wake-up signal corresponds to N on-durations, and M on-durations for the first wake-up signal have not started, stop monitoring the PDCCH within the M on-durations for the first wake-up signal, N is a positive integer being not less than 2, and M is a positive integer being less than or equal to N.

In some embodiments, the apparatus further includes: a determining module, configured to switch from a source band width part (BWP) to a target BWP, and determine the result that the first wake-up signal is monitored or the result that the first wake-up signal is not monitored, in response to missing a monitoring moment of the first wake-up signal on the target BWP.

In some embodiments, the determining module is configured to determine the result that the first wake-up signal is monitored or the result that the first wake-up signal is not monitored based on configuration information.

In some embodiments, the determining module is configured to determine the result that the first wake-up signal is monitored or the result that the first wake-up signal is not monitored based on a monitoring result of a second wake-up signal, in which the second wake-up signal is a wake-up signal whose monitoring moment is before the monitoring moment of the first wake-up signal.

In some embodiments, the determining module is configured to perform at least one of: determining the result that the first wake-up signal is monitored when W1 second wake-up signals are continuously monitored on the source BWP before the current moment, where W1 is a positive integer; and determining the result that the first wake-up signal is monitored when W2 second wake-up signals are continuously monitored on the source BWP in a predetermined duration, where W2 is a positive integer.

In some embodiments, the determining module is configured to determine the result that the first wake-up signal is monitored or the result that the first wake-up signal is not monitored based on determination information.

In some embodiments, the apparatus further includes: a receiving module, configured to receive a broadcast signaling that carries the determination information; or, receive a dedicated signaling that carries the determination information.

In some embodiments, the apparatus further includes: a configuring module, configured to set a monitoring strategy that the first wake-up signal corresponds to one of the on-durations in response to switching from the source BWP to the target BWP and missing the monitoring moment of the first wake-up signal on the target BWP.

Alternatively, the configuring module is configured to set a monitoring strategy that the first wake-up signal corresponds to N on-durations in response to switching from the source BWP to the target BWP and missing the monitoring moment of the first wake-up signal on the target BWP, N is a positive integer being not less than 2.

The embodiments further provide an apparatus for sending a signaling. The apparatus includes: a sending module, configured to send a signaling including determination information, the signaling includes: a broadcast signaling or a dedicated signaling.

The determination information is used to determine a result that a first wake-up signal is monitored or a result that a first wake-up signal is not monitored, in response to switching from a source BWP to a target BWP and missing the first wake-up signal on the target BWP.

Figure 10:
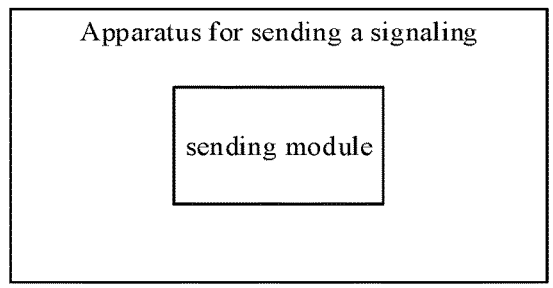
FIG. 10 is a structural schematic diagram of an apparatus for sending a signaling according to an embodiment of the disclosure.

As illustrated in FIG. 10, the embodiments of the disclosure provide an apparatus for sending a signaling. The apparatus includes: a sending module, configured to send a signaling including determination information, the signaling includes: a broadcast signaling or a dedicated signaling.

The determination information is used to determine a result that a first wake-up signal is monitored or a result that a first wake-up signal is not monitored, in response to switching from a source BWP to a target BWP and missing the first wake-up signal on the target BWP.

The apparatus for sending a signaling according to the embodiments can be a device applied to a network element of an access network such as a base station, and can send a signaling carrying the determination information through the sending module, so that the terminal can receive the determination information.

In some embodiments, the apparatus for sending a signaling further includes: a storage module. The storage module is connected to the sending module and can be used to store the determination information.

Several specific examples are provided below in combination with any of the foregoing embodiments.

Example 1

The UE switches to the target BWP. If the monitoring moment of the WUS on the BWP is missed, the adopted monitoring strategy is to perform processing in response to the currently missed WUS monitoring moment based on the determination result that the WUS is monitored or the determination result that the WUS is not monitored. The terminal monitors the PDCCH based on the determination result that the WUS is monitored. The terminal stops monitoring the PDCCH based on the determination result that the WUS is not monitored. The missed WUS here is the aforementioned first wake-up signal.

In detail, after the UE switches to the target BWP, in response to missing the monitoring moment of the WUS on the target BWP, the adopted monitoring strategy is: processing in response to the currently missed monitoring moment of the WUS based on the determination result that the WUS is monitored, that is, monitoring within an effective range of subsequent on-durations of the WUS.

The effective range of the WUS includes: the WUS corresponding to one of the on-durations, that is, a 1:1 mapping scenario of the WUS and one on-duration; and the WUS corresponding to a plurality of the on-durations, that is, a 1:N mapping scenario of the WUS and N on-durations.

Example 2

Based on Example 1, this example is aimed at the 1:1 mapping scenario. When the terminal misses the WUS on the target BWP, there are several possible cases in which the PDCCH is monitored or not monitored according to the monitoring strategy.

In case 1, when the terminal switches to the target BWP, the on-duration corresponding to the WUS has started, then the terminal still monitors within a remaining duration of the current on-duration.

In case 2, when the terminal switches to the target BWP, and the on-duration corresponding to the WUS has not started, the terminal monitors from the on-duration that is about to start.

Example 3

Based on Example 1, this example is aimed at the 1:N mapping scenario. When the terminal misses the WUS on the target BWP, there are several possible cases in which the PDCCH is monitored or not monitored according to the monitoring strategy.

In case 1, when the terminal switches to the target BWP, the on-duration corresponding to the WUS on the target BWP has started. At this time, the terminal starts to monitor within a remaining duration of the current on-duration from the moment when the terminal switches to the target BWP, and continue to monitor within the remaining M on-durations that are upcoming. M is a number of on-durations of N after removing the missed on-durations.

For example, assuming N=4, the terminal switches to the target BWP at the starting moment of the second on-duration, the terminal starts monitoring from the remaining duration of the second on-duration, which includes a part of the $2^{nd}$ on-duration and the remaining 2 on-durations.

In case 2, when the terminal switches to the target BWP, the on-duration corresponding to the WUS on the target BWP has started, the terminal continues to monitor within the remaining M on-durations that are upcoming from the moment of switching to the target BWP. M is the number of on-durations of N after removing the missed on-durations.

For example, assuming N=4, the terminal switches to the target BWP during the second on-duration, the terminal starts monitoring from the third on-duration, that is, continues to monitor within the remaining 2 on-durations.

In case 3, when the terminal switches to the target BWP, the on-duration of the WUS on the target BWP has not started. At this time, the terminal continues to monitor the remaining M on-durations that are upcoming from the moment of switching to the target BWP. M is less than or equal to N.

Example 4

Based on Example 1, Example 2, and Example 3, this example provides a method for determining whether the WUS missed on the BWP is monitored. The method includes: when the terminal switches to the target BWP and misses the monitoring moment of the WUS, in the adopted monitoring strategy that in response to the current monitoring moment of the missed WUS, processing is performed based on the result that the WUS is monitored or not monitored, whether WUS is monitored can be determined based on the specified protocol or by the terminal.

In a possible implementation, the protocol specifies that when the terminal switches to the target BWP and misses the monitoring moment of the WUS, the adopted monitoring strategy is that processing is performed in response to the current monitoring moment of the WUS based on the result that the WUS is monitored.

In another possible implementation, when the terminal switches to the target BWP and misses the monitoring moment of the WUS, the adopted monitoring strategy is deciding in advance whether the WUS is monitored. The deciding process can be based on the historical WUS monitoring situations.

In case 1, when it is determined that W WUSs are continuously monitored on the original BWP before switching the BWP, it is considered that intensive service dispatching is processed currently, so for the current missed monitoring moment of the WUS, processing is performed based on the result that the WUS is monitored.

In case 2, when the terminal is required to perform calculations, the determination parameters and determination rules can be notified to the terminal in a broadcasting mode or a dedicated signaling mode.

In some cases, when the terminal switches to the target BWP and misses the monitoring moment of the WUS, the adopted monitoring strategy can be configured based on 1:1 or 1:N respectively. The embodiment of the disclosure also provides a communication device, which may be a terminal, and can implement the method for monitoring the PDCCH according to any of the foregoing technical solutions.

The communication device can also be a network element of an access network such as a base station, and can implement the method for sending a signaling according to any of the foregoing technical solutions.

The communication device according to the embodiments includes: a transceiver, a memory and a processor. The transceiver is configured to interact with other devices. The transceiver includes but is not limited to a transceiver antenna. The memory may store computer-executable instructions. The processor is connected to the transceiver and the memory respectively, and can implement the method for monitoring the PDCCH or the method for sending a signaling according to any of the foregoing technical solutions.

Figure 11:
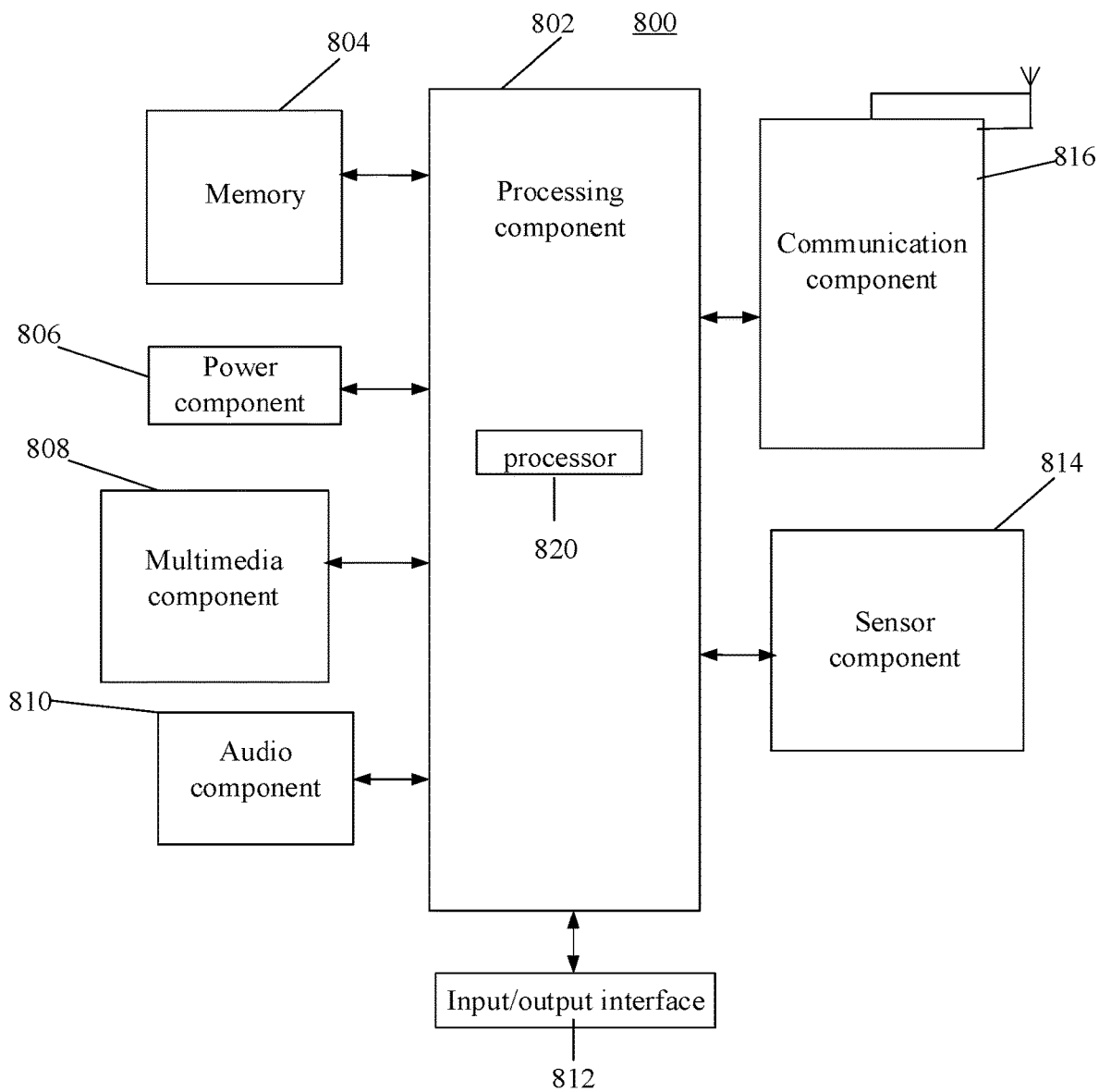
FIG. 11 is a structural schematic diagram of a terminal according to an embodiment of the disclosure.

FIG. 11 shows a terminal according to an exemplary embodiment. The terminal may be a mobile phone, a computer, a digital broadcasting terminal, a message transceiver device, a game console, a tablet device, a medical device, a fitness device and a personal digital assistant.

As illustrated in FIG. 11, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the apparatus 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the apparatus 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 804, executable by the processor 820 in the apparatus 800, for performing the above method. For example, the non-transitory computer-readable storage medium may be a ROM, a RAM, a CD-ROM, a magnetic tape, a floppy disc, an optical data storage device, and the like.

Figure 12:
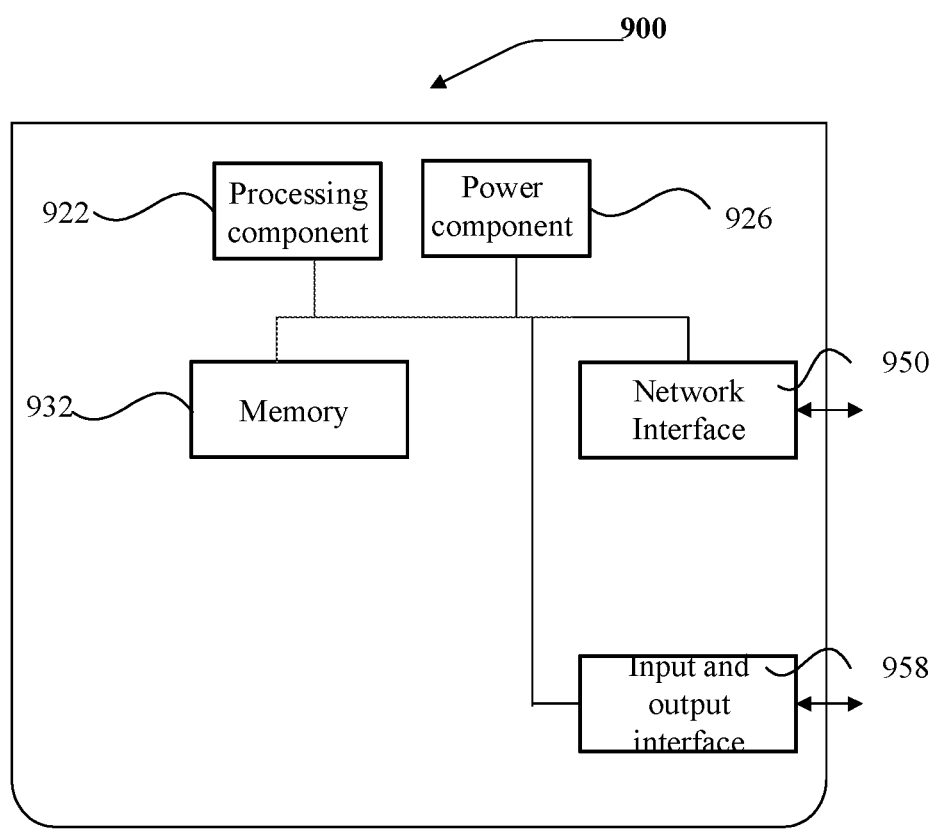
FIG. 12 is a structural schematic diagram of a base station according to an embodiment of the disclosure.

FIG. 12 is a schematic diagram of a base station. The apparatus 900 includes a processing component 922. The processing component 922 further includes one or more processors, and a memory resource represented by a memory 932, for storing instructions that can be executed by the processing component 922, such as application programs. The application programs stored in the memory 932 may include one or more modules each corresponding to a set of instructions. In addition, the processing component 922 is configured to execute instructions to execute the method for monitoring a PDCCH shown in FIG. 4 and/or FIG. 5.

The base station may also include a power component 926 configured to perform power management of the apparatus 900, a wired or wireless network interface 950 configured to connect the apparatus 900 to a network, and an input/output (I/O) interface 958. The apparatus 900 can operate based on an operating system stored in the memory 932, such as Windows Server™, Mac OS X™, Unix™, Linux™, FreeBSD™ or the like.

Other embodiments of the disclosure may be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It may be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for monitoring a physical downlink control channel (PDCCH), comprising:
    switching from a source band width part (BWP) to a target BWP; and
    monitoring the PDCCH according to a monitoring strategy that a wake-up signal is considered as monitored, in response to missing a monitoring moment of the wake-up signal on the target BWP.

2. The method of claim 1, wherein monitoring the PDCCH according to the monitoring strategy comprises:
    monitoring the PDCCH according to the monitoring strategy within on-durations associated with the first wake-up signal.

3. The method of claim 2, wherein monitoring the PDCCH within the on-durations associated with the wake-up signal comprises:
    when the wake-up signal is associated with one on-durations, and the on-duration associated with the wake-up signal has started, monitoring the PDCCH within a remaining duration of the on-duration associated with the wake-up signal that has started at a current moment; or
    when the wake-up signal is associated with one on-duration, and the on-duration associated with the wake-up signal has not started, monitoring the PDCCH within the on-duration associated with the wake-up signal.

4. The method of claim 2, wherein monitoring the PDCCH within the on-durations associated with the wake-up signal comprises:
    when the wake-up signal is associated with N on-durations, and the N on-durations associated with the wake-up signal have started, monitoring the PDCCH within a remaining duration of the currently started on-duration and within M remaining on-durations behind the currently started on-duration, where N is a positive integer being not less than 2, and M is a positive integer being less than N; or
    when the wake-up signal is associated with N on-durations, and the N on-durations associated with the wake-up signal have started, monitoring the PDCCH within M on-durations behind the currently started on-duration, where N is a positive integer being not less than 2, and M is a positive integer being less than N; or
    when the wake-up signal is associated with N on-durations, and M on-durations associated with the wake-up signal have not started, monitoring the PDCCH within the M on-durations, where M is a positive integer being less than or equal to N.

5. The method of claim 1, further comprising:
    stopping monitoring the PDCCH according to a monitoring strategy that the wake-up signal is considered as not monitored, in response to switching from the source BWP to the target BWP and missing the monitoring moment of the wake-up signal on the target BWP.

6. The method of claim 5, wherein stopping monitoring the PDCCH, comprises:
    stopping monitoring the PDCCH according to the monitoring strategy that the wake-up signal is considered as not monitored within on-durations associated with the wake-up signal.

7. The method of claim 6, wherein stopping monitoring the PDCCH within the on-durations associated with the wake-up signal, comprises:
    when the wake-up signal is associated with one on-duration, and the on-duration associated with the wake-up signal has started, stopping monitoring the PDCCH within a remaining duration of the on-duration associated with the wake-up signal that has started at a current moment; or
    when the wake-up signal is associated with one on-duration, and the on-duration associated with the wake-up signal has not started, stopping monitoring the PDCCH within the on-duration associated with the wake-up signal.

8. The method of claim 6, wherein stopping monitoring the PDCCH within the on-durations associated with the wake-up signal, comprises:
    when the wake-up signal is associated with N on-durations, and the N on-durations associated with the wake-up signal have started, stopping monitoring the PDCCH within a remaining duration of the currently started on-duration and within M remaining on-durations behind the currently started on-duration, where N is a positive integer being not less than 2, and M is a positive integer being less than N; or
    when the first wake-up signal is associated with N on-durations, and M on-durations associated with the wake-up signal have not started, stopping monitoring the PDCCH within the M on-durations, where N is a positive integer being not less than 2, and M is a positive integer being less than or equal to N.

9. The method of claim 1, further comprising:
configuring the monitoring strategy in which the wake-up signal is associated with one on duration, in response to switching from the source BWP to the target BWP and missing the monitoring moment of the wake-up signal on the target BWP; or
configuring the monitoring strategy in which the wake-up signal is associated with the N on-duration, in response to switching from the source BWP to the target BWP and missing the monitoring moment of the wake-up signal on the target BWP, where N is a positive integer not less than 2.

10. A communication device, comprising:
a transceiver;
a memory configured to store computer instructions; and
a processor, respectively connected to the transceiver and the memory, wherein the processor is configured to control transmission and reception of the transceiver by executing the computer instructions, and the processor is caused to implement the method for monitoring a physical downlink control channel (PDCCH), the method comprising:
switching from a source band width part (BWP) to a target BWP; and
monitoring the PDCCH according to a monitoring strategy that a wake-up signal is considered as monitored, in response to missing a monitoring moment of the wake-up signal on the target BWP.

11. The communication device of claim 10, wherein monitoring the PDCCH according to the monitoring strategy comprises:
monitoring the PDCCH according to the monitoring strategy within on-durations of an associated with the wake-up signal.

12. The communication device of claim 11, wherein monitoring the PDCCH within the on-durations associated with the wake-up signal comprises:
when the wake-up signal is associated with one on-duration, and the on-duration associated with the wake-up signal has started, monitoring the PDCCH within a remaining duration of the on-duration associated with the wake-up signal that has started at a current moment; or
when the wake-up signal is associated with one on-duration, and the on-duration for-associated with the first wake-up signal has not started, monitoring the PDCCH within the on-duration associated with the wake-up signal.

13. The communication device of claim 11, wherein monitoring the PDCCH within the on-durations associated with the wake-up signal comprises:
when the wake-up signal is associated with N on-durations, and the N on-durations associated with the wake-up signal have started, monitoring the PDCCH within a remaining duration of the currently started on-duration and within M remaining on-durations behind the currently started on-duration, where N is a positive integer being not less than 2, and M is a positive integer being less than N; or
when the wake-up signal is associated with N on-durations, and the N on-durations associated with the wake-up signal have started, monitoring the PDCCH within M on-durations behind the currently started on-duration, where N is a positive integer being not less than 2, and M is a positive integer being less than N; or
when the wake-up signal is associated with N on-durations, and M on-durations associated with the wake-up signal have not started, monitoring the PDCCH within the M on-durations, where M is a positive integer being less than or equal to N.

14. The communication device of claim 10, further comprising:
stopping monitoring the PDCCH according to a monitoring strategy that the wake-up signal is considered as not monitored, in response to switching from the source BWP to the target BWP and missing the monitoring moment of the first wake-up signal on the target BWP.

15. The communication device of claim 14, wherein stopping monitoring the PDCCH, comprises:
stopping monitoring the PDCCH according to the monitoring strategy that the wake-up signal is considered as not monitored within on-durations associated with the wake-up signal.

16. The communication device of claim 15, wherein stopping monitoring the PDCCH within the on-durations associated with the wake-up signal, comprises:
when the wake-up signal is associated with one on-duration, and the on-duration associated with the wake-up signal has started, stopping monitoring the PDCCH within a remaining duration of the on-duration associated with the wake-up signal that has started at a current moment; or
when the wake-up signal is associated with one on-duration, and the on-duration associated with the wake-up signal has not started, stopping monitoring the PDCCH within the on-duration associated with the wake-up signal.

17. The communication device of claim 15, wherein stopping monitoring the PDCCH within the on-durations associated with the wake-up signal, comprises:
when the wake-up signal is associated with N on-durations, and the N on-durations associated with the wake-up signal have started, stopping monitoring the PDCCH within a remaining duration of the currently started on-duration and within M remaining on-durations behind the currently started on-duration, where N is a positive integer being not less than 2, and M is a positive integer being less than N; or
when the wake-up signal is associated with N on-durations, and M on-durations associated with the wake-up signal have not started, stopping monitoring the PDCCH within the M on-durations, where N is a positive integer being not less than 2, and M is a positive integer being less than or equal to N.

18. The communication device of claim 10, further comprising:
configuring the monitoring strategy in which the wake-up signal is associated with one on-durations, in response to switching from the source BWP to the target BWP and missing the monitoring moment of the wake-up signal on the target BWP; or
configuring the monitoring strategy in which the wake-up signal is associated with the N on-durations, in response to switching from the source BWP to the target BWP and missing the monitoring moment of the wake-up signal on the target BWP, where N is a positive integer not less than 2.

19. A non-transitory computer-readable storage medium on which computer-executable instructions are stored, wherein when the computer-executable instructions are executed by a processor, a method for monitoring a physical downlink control channel (PDCCH) is implemented, the method comprising:

switching from a source band width part (BWP) to a target BWP; and monitoring the PDCCH according to a monitoring strategy that a wake-up signal is considered as monitored, in response to missing a monitoring moment of the wake-up signal on the target BWP.

20. The communication device of claim 19, wherein monitoring the PDCCH according to the monitoring strategy comprises:

monitoring the PDCCH according to the monitoring strategy within on-durations associated with the wake-up signal.

\* \* \* \* \*